United States Patent [19]

Engler

[11] Patent Number: 5,497,585
[45] Date of Patent: Mar. 12, 1996

[54] BIRD ANTI-PERCHING DEVICE

[76] Inventor: Carl W. Engler, 1331 Marianna Rd., Pasadena, Calif. 91105-2746

[21] Appl. No.: 55,765

[22] Filed: May 3, 1993

Related U.S. Application Data

[63] Continuation of Ser. No. 789,929, Nov. 12, 1991, abandoned.

[51] Int. Cl.⁶ .................................................. A01K 3/00
[52] U.S. Cl. .................................................. 52/101
[58] Field of Search .................... 52/101; 119/97 AR; 114/221 R; 43/1; 138/110, 121

[56] References Cited

U.S. PATENT DOCUMENTS

| | | | |
|---|---|---|---|
| 2,485,148 | 10/1949 | Fralin | 52/101 |
| 2,938,244 | 5/1960 | Christensen | 52/101 |
| 3,005,436 | 10/1961 | Caldwell | 114/221 R |
| 4,262,169 | 4/1981 | Lanton | 52/101 X |
| 4,748,060 | 5/1988 | Fry | 138/151 X |
| 4,937,988 | 7/1990 | Gratton | 52/101 |
| 4,962,619 | 10/1990 | Chatten | 52/101 |
| 4,967,799 | 11/1990 | Bradshaw | 138/110 X |

FOREIGN PATENT DOCUMENTS

| | | | |
|---|---|---|---|
| 2507058 | 12/1982 | France | 52/101 |
| 1036893 | 8/1983 | U.S.S.R. | 52/101 |
| 2194566 | 3/1988 | United Kingdom | 52/101 |

Primary Examiner—Carl D. Friedman
Assistant Examiner—Beth A. Aubrey
Attorney, Agent, or Firm—Laurence R. Brown

[57] ABSTRACT

A bird anti-perching device for preventing birds and other animals from perching, nesting or crossing on billboards and other structures such as utility lines, branches, ledges, roof tops and overhangs. In a preferred embodiment, the device has a plurality of rotatable rings strung consecutively on a cable supported above the top frame member of a billboard. The cable is supported above the top frame member by two support arms placed at opposite ends of the billboard. The support arms incorporate a tightening means for making adjustments in the height and rigidity of the cable.

8 Claims, 4 Drawing Sheets

BIRD ANTI-PERCHING DEVICE

This application is a continuation of application Ser. No. 07/789,929, filed Nov. 12, 1991, now abandoned.

BACKGROUND OF THE INVENTION

1 Field of the Invention

The present invention relates to apparatus and methods for preventing birds from perching on structures so as to keep their droppings from accumulating on objects directly below. More particularly, the apparatus is especially suited for placement on billboards and their related support structures to prevent bird droppings from accumulating the billboard flames and the signs posted below. The present invention also relates to apparatus and methods for preventing birds and small animals from crossing, nesting or chewing through elongated cylindrical structures such as utility lines or other cables over which one embodiment of the invention may be placed.

2 Prior Art

Within the billboard industry, great inconvenience and economic waste is created by birds perching on billboards and defecating upon the frames, structures and signs below. As bird droppings accumulate, they cause great difficulty for workmen who must maintain and replace the signs on the billboards. The accumulation presents a health hazard to the workmen who come in contact with it. The accumulation also facilitates deterioration of the signs in both visual appearance and structural integrity, thus creating the need to maintain and replace the signs more often.

Several solutions to this problem have been attempted with varying degrees of success. One of the oldest and most common methods of preventing birds from gathering and perching on top of an object is to place a molded figurine of an owl or a hawk in close proximity to the roosting area. The presence of an apparent predator in the area will naturally keep most birds away, at least temporarily. However, the drawback with this method is that the figurine's utility is lost once the birds realize it is only a harmless, stationary piece of plastic.

Another common method of preventing birds from perching on a surface is to apply an adhesive glue to the surface itself. The discomfort caused to the birds from having their feet stick to the surface is sufficient to persuade them not to perch on the surface again. Although this method has proven successful, bird droppings from initial roostings still accumulate upon the treated surface, causing the adhesive to quickly lose its effect. Thus, once a large number of birds have tried perching on the treated surface, the adhesive must be reapplied.

One of the more recent methods of preventing birds from perching on top of billboards has been the use of motorized wire propellers placed above the billboards. The wires rotate circularly in a generally horizontal plane similar to helicopter propellers so that the birds are unable to land or perch on the surface beneath the propellers. The main disadvantage of this method is that it requires electricity, which may not be available at billboards located along isolated highways. Another problem is the high cost to purchase, install and maintain these motorized wire propellers.

In addition to the above noted methods, several other, more simple solutions to the problem have also been attempted. One method of preventing birds from landing on a structure is to encapsulate the structure with a material which acts as a barrier, such as chicken wire or plywood. Another method commonly used is to place nail-like spikes having pointed ends into the landing surface so that the birds have no place to land but on the points of the spikes. Another method, which is not in favor at present, is the placement of arsenic-laced feed in the vicinity of the perching area. A further method which is simple and convenient to use is the placement of "mylar strands" around and upon the structure, so that the strands produce an annoying hum when the wind blows, scaring any birds away.

SUMMARY OF THE INVENTION

The present invention discloses a device designed to prevent birds from perching on top of billboards without the use of expensive equipment and which does not require frequent repair or replacement. The same device may also be used on most other structures, such as utility lines, branches, ledges, roof tops and overhangs, where birds normally land or other small animals like to sit or cross.

The device comprises a support means affixed to the top frame member of a billboard such that a series of rotatable rings threaded by a cable may be extended along the top surface of the top frame member. The cable is held at a height above the top frame member sufficient to prevent birds from landing upon the billboard. The support means is adapted to permit rotation of the suspended portion of the cable around a longitudinal axis of the top frame member such that it may be rotated from a position directly above the top frame member to a position on the side thereof to facilitate maintenance of the billboard.

A tensioning mechanism is provided and affixed to the support means for tightening the cable to the desired rigidity and for facilitating installation and maintenance. The tightening means incorporates the use of swedge screws attached to each end of the cable for easy fastening and disengagement of the cable.

A plurality of rotatable rings are provided with each having an inner cavity such that they may be strung together over the suspended portion of the cable extending along the billboard frame. The inner cavity of the rings is preferably cylindrical and is of a diameter sufficiently larger than the diameter of the cable such that the rings may rotate freely around the cable without impediment. In addition, the outer diameter of the rings is sufficiently small to prevent the bird or other small animal from balancing on the rings. The rings are placed consecutively along the suspended portion of the cable in such proximity to each other that a bird is unable to land on the cable itself.

When the bird attempts to land on top of the billboard he is forced by the placement of the invention to place his feet on the rings encompassing the cable. Due to the uninhibited rotational movement of the rings, the bird lose his balance and is forced to find a more stable surface on which to perch.

DETAILED DESCRIPTION OF THE INVENTION

Figure 5:
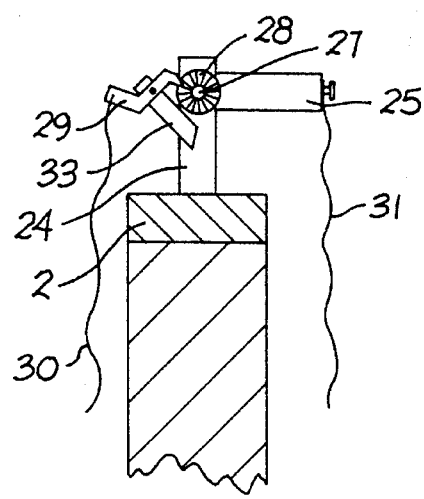
FIG. 5 is a side elevational view of an anti-perching device constructed according to a further and preferred embodiment of the invention affixed to the billboard showing the preferred form of the support means.
Figure 6:
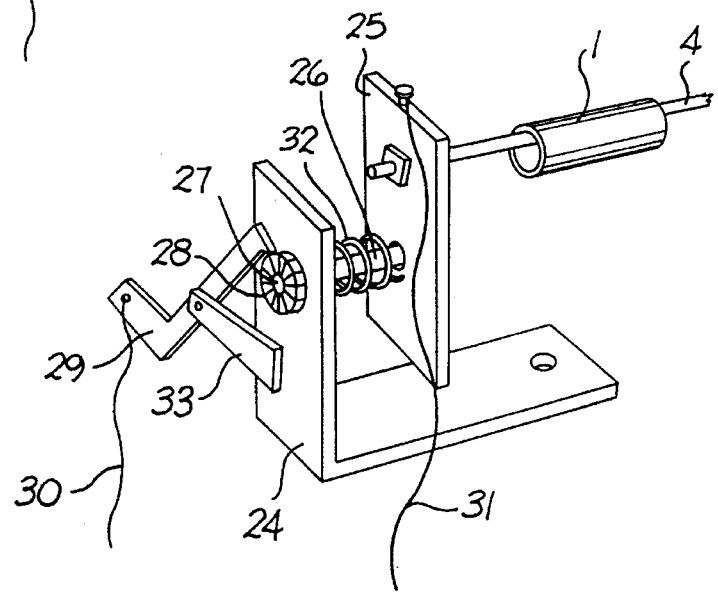
FIG. 6 is an enlarged fragmentary perspective view of the FIG. 5 embodiment of showing the manner of connection upper and lower support arms thereof.
Figure 8:
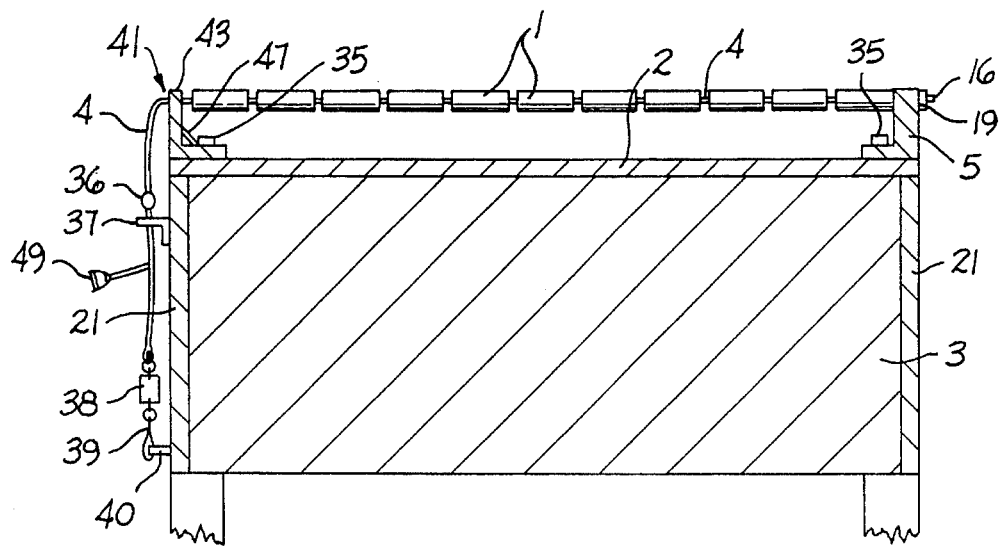
FIG. 8 is a front view of another alternate embodiment of the anti-perching device of the invention showing the cable attached to the lower portion of the side frame member of a billboard.

With reference to the drawings in detail, the preferred embodiment of the invention, as shown in FIGS. 5, 6, and 8, is designed specifically for placement on billboards (3) since this embodiment is particularly adapted to facilitate the maintenance of billboards (3) and the replacement of the signs. However, as one of ordinary skill in the art would realize, the present invention is not limited to the preferred embodiment disclosed herein, nor to the specific field for which it is described. Other possible applications of the present invention include, but are not limited to, preventing birds and other animals from perching on or crossing support structures, fences, utility lines, and tree branches. In addition, the present invention is particularly well-suited for use on those portions of offices and other buildings which lack easy access and where birds often land, such as ledges, over-hangs and roof tops.

The present invention comprises a plurality of rotatable rings (1) threaded by a cable (4) supported above the top frame member (2) of the billboard (3). The rotatable rings (1) are preferably cylindrical in shape to permit free rotational movement upon contact and have a length that may be varied depending on the length of the structure on which they are placed. For a normal size billboard (3), the rotatable rings (1) would be approximately three inches long. They are placed on the cable (4) at a horizontal distance (6) from each other sufficiently close to prevent a bird from landing on the cable (4), but far enough from each other to permit uninhibited rotation.

Figure 2:
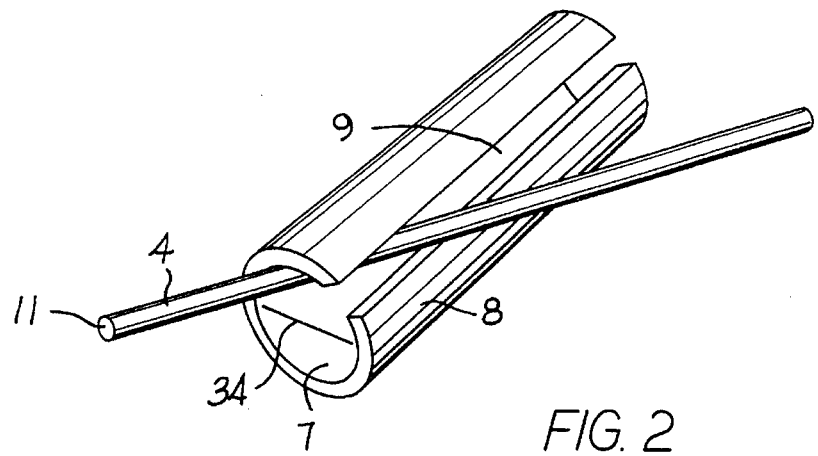
FIG. 2 is an enlarged perspective view of a rotatable ring showing the lengthwise incision through the outer cylindrical wall and a manner of attachment to the cable.

Referring to FIG. 2, the rotatable rings (1) have a cylindrical cavity (7) defined by cylindrical wall (8), with the cylindrical cavity (7) having a diameter (34) large enough relative to the cable (4) to facilitate rotation of the rotatable rings (1) upon contact. In order to make it even more difficult for a bird or small animal to balance upon the rotatable rings, the outer cylindrical wall (8) is preferably provided with an outer diameter of approximately one half inch. This choice for the diameter of the cylindrical wall (8) is for reference only since the diameter may be varied to suit a particular cable (4) or to enhance the rotation of the rotatable rings (1). The rotatable rings (1) may, in the alternative, be provided with any of multitude of shapes other than that of the cylindrical wall (8) which will also provide an unstable surface for preventing the perching of birds thereon.

Figure 7:
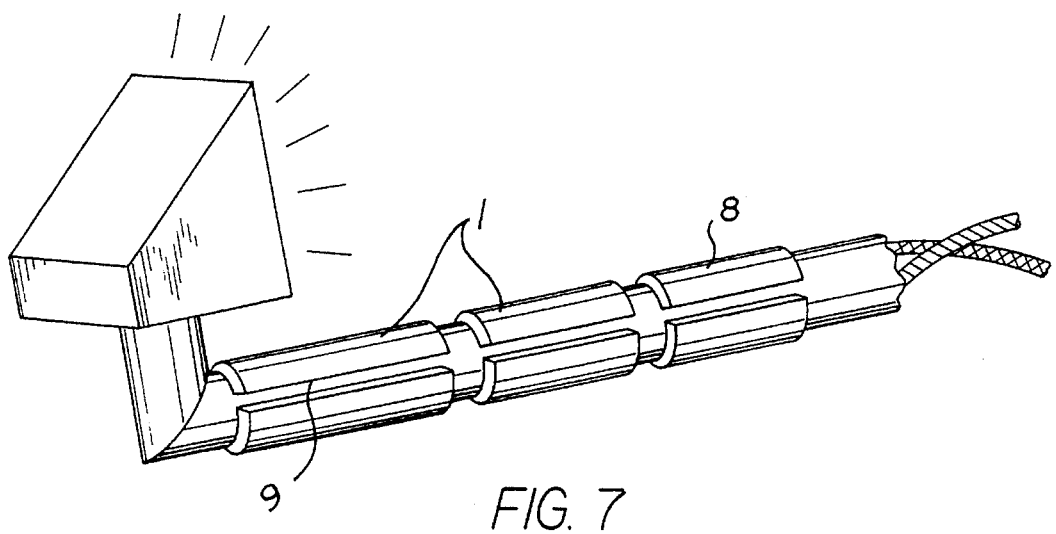
FIG. 7 is a perspective view of the rotatable rings comprising a lengthwise incision and being attached to a cylindrical structure such as the utility conduct supporting a light fixture as shown.

The cylindrical wall (8) of the rotatable rings (1) may further be provided with a lengthwise incision (9) running from one end to the other and penetrating through to the inner cylindrical cavity (7). This lengthwise incision (9) permits the rotatable rings (1) to be placed upon existing cables, utility lines or other cylindrical structures, as shown in FIG. 7, by simply pulling the cylindrical wall (8) open and pressing the rotatable rings (1) onto the cylindrical structure. In order to permit the deformation of the rotatable rings (1) in this manner, it is preferable that the rotatable rings (1) be manufactured from a flexible, but weather resistant, material such as a suitable synthetic polymeric material, which may or may not have an ultraviolet light protective coating for inhibiting deterioration caused by the sun. However, the rotatable rings (1) are not limited to such polymeric materials, but may also be manufactured from malleable metals or other synthetic materials. In the event the rotatable rings do not have the lengthwise incision (9), they may be threaded onto one end of the cable (4) in a consecutive manner.

Figure 1:
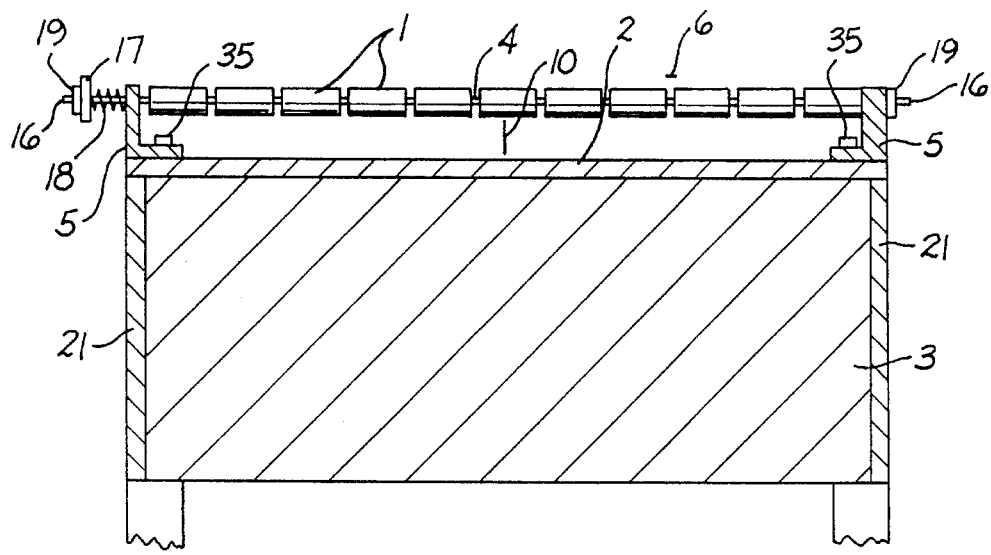
FIG. 1 is a front elevational view of an anti-perching device constructed according to a first embodiment of the invention affixed to a billboard as it would appear during operation.

With reference to FIG. 1, to prevent birds from landing on the top frame member (2) of the billboard (3), or on any of the other structures noted above, the cable (4) is stretched along the entire length of the top frame member (2) and is supported at a vertical distance (10) above the top frame member (2) sufficient to preclude a bird from sitting underneath the cable (4). The cable (4) is manufactured with a plastic or vinyl coating (11) (See FIG. 2) which is treated to prevent ultra-violet light deterioration and which provides a smooth surface to reduce friction and prevent fraying of the cable (4) itself. Although the size and construction of the cable (4) can take many forms, it is preferred that the cable (4) be three-sixteenths of an inch in diameter and be manufactured by means of seven large strands interwoven with nineteen smaller strands of stainless steel fiber.

The preferred embodiment of the present invention, as shown in FIGS. 5 and 6, includes a lower support arm (24) and an upper support arm (25) placed at each end of the top frame member (2). The lower support arms (24) are affixed to the top frame member (2), while the upper support arms (25) are pivotally connected to each of the lower support arms (24) by means of an axial rod (26) so that the rotatable rings (1) threaded by the cable (4) may be rotated to a side position (see FIG. 5) in order to facilitate maintenance of the billboard (3). The pivotal connection (27) between the lower support arms (24) and the upper support arms (25) at one end of the top frame member (2) further includes a gear (28) and a lever or pawl (29) working in a cooperative manner to provide for selective adjustment in the rotation of the upper support arms (25). In order to rotate the upper support arms (25) from below, a lever string (30) and an arm string (31) are used to manipulate the position of the upper support arms (25). An axial spring (32) encircling the axial rod (26) is affixed between the lower support arm (24) and the upper support arm (25) to provide tension against the lever (29) positioned on a lever support (33). To rotate the upper support arms (25) downward, the arm string (31) is pulled against the tension of the axial spring (32) while the lever (29) acts to lock the gear (28) in the desired rotated position. A workman may now place a hooked ladder over the top frame member (2) of the billboard (3) without the cable (4) interfering with the maintenance of the billboard (3). To cause the upper support arms (25) to return to their upright position, the lever string (30) is pulled to release the lever (29) from the gear (28). The axial spring (32) then retracts to its initial position.

An alternate embodiment of the present invention, as shown in FIG. 1, is particularly suited for placement on structures other than billboards (3), such as the ledges, over-hangs and rooftops of offices and other buildings where birds and small animals tend to congregate. This embodiment of the invention makes use of two L-shape support arms (5) placed at opposite ends of the top frame member (2) of the billboard (3). It is noted that the choice of the L-shape support arms (5) is merely one of convenience for simplicity in description and the specific design is in no way limited to such L-shape support arms (5). The support arms (5) may be manufactured out of any material capable of withstanding the tension of the cable (4) produced when birds attempt to land on the rotatable rings (1) including, but not limited to aluminum, steel, or hardened plastic. The support arms (5) are provided with a horizontal member opening (12) to facilitate attachment of the support arms (5) to the top frame member (2). A vertical member opening (13) passing from an inside surface (14) to an outside surface (15) of the support arms (5) is further provided for attachment of the cable (4) between the support arms (5). The top frame member (2) may be attached by high strength stainless steel bolts having teflon coated lock nuts, or other similar means, extending through the horizontal member opening (12).

Figure 3:
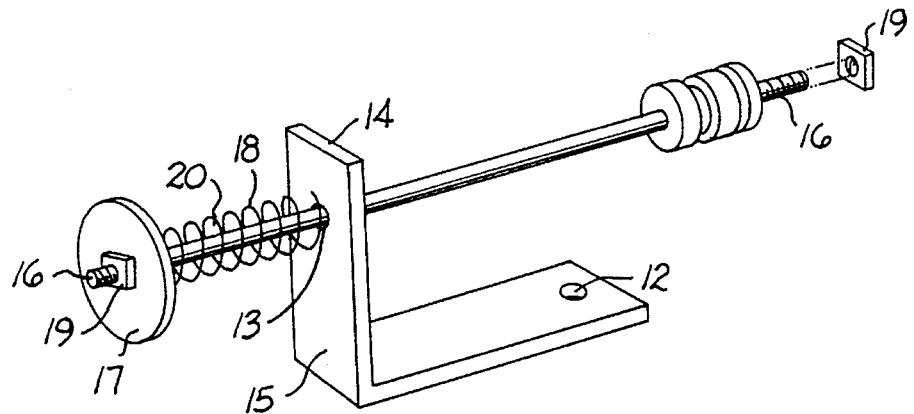
FIG. 3 is an enlarged perspective view of a support arm showing the preferred manner of attachment of the tightening means to the support arm.

As seen most clearly in FIG. 3, the cable (4) is attached to the support arms (5) by swedge screws (16) affixed to each end of the cable (4), and a stop member (17) placed on the outside of a helical tension spring (18), whereby the helical tension spring (18) is compressed between the stop member (17) and the outside surface (15) of one of the support arms (5). At one end of the top frame member (2), the cable (4) is attached to the support arm (5) by placing the swedge screw (16) through the vertical member opening (13) of the support arm (5) and threading a nut (19) onto the swedge screw (16) until tight. At the other end of the top frame member (2), the cable (4) is threaded through both the vertical opening (13) of the support arm (5) and a central cavity (20) of the helical tension spring (18). The stop member (17) is then secured to the cable (4) on the outside end of the helical tension spring (18) by threading a nut (19) onto the swedge screw (16).

During operation, the vertical distance (10) (see FIG. 1) between the top frame member (2) and the cable (4) may be adjusted by simply loosening or tightening the nut (19) on the swedge screw (16) adjacent the stop member (17) such that the compression on the helical tension spring (18) is either reduced or increased, respectively. This manner of construction also facilitates maintenance of the billboard (3) in that the end of a hook ladder may be placed on top of the cable (4), whereby the helical tension spring (18) will compress to permit the hooks of the ladder to pull the cable (4) down to the top frame member (2).

Figure 4:
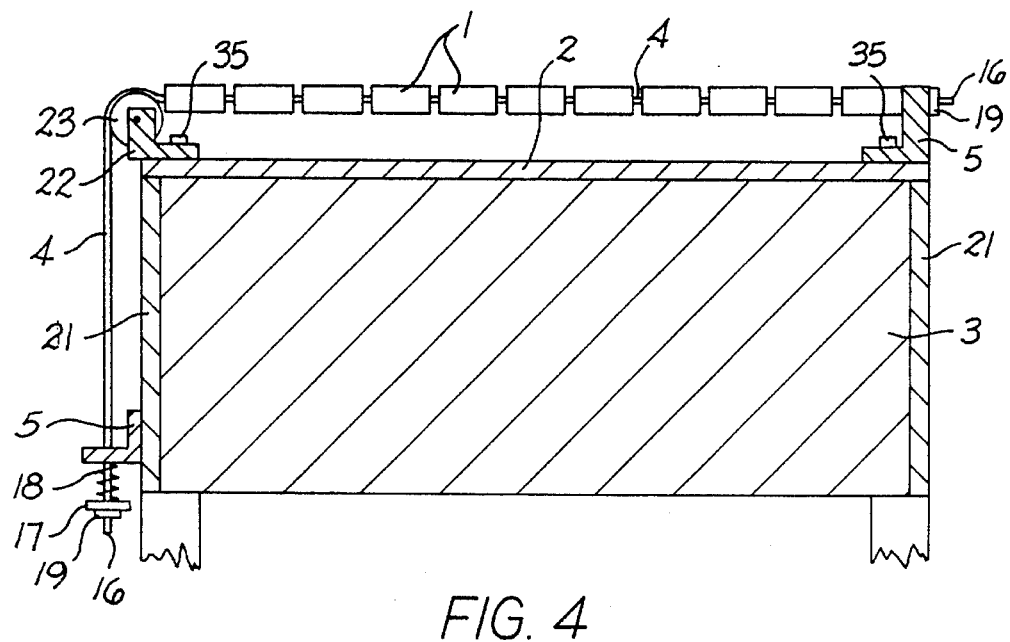
FIG. 4 is a front elevational view of an anti-perching device constructed according to a second embodiment of the invention affixed to the billboard showing an alternate form of the support means and the tightening means.

In an alternate embodiment of the present invention, shown in FIG. 4, the helical tension spring (18) is placed on a side frame member (21) of the billboard (3) so as to facilitate adjustment of the invention by bringing the helical tension spring (18) within reach of a person standing on the access deck of the billboard. In this embodiment, the support arm (5) nearest to the helical tension spring (18) is affixed to the side frame member (21) in the same manner as described above. In order to redirect the cable (4) from above the top frame member (2) to along the side frame member (21), a third support arm (22) is similarly affixed to the end of the top frame member (2) nearest to the helical tension spring (18). A pulley (23) is then affixed to the third support arm (22) so that the cable (4) freely rotates around the pulley (23) to the helical tension spring (18) below.

In another alternate embodiment, as shown in FIG. 8, the cable (4) passes through a second vertical member opening (41) of a fourth support arm (43) and is provided with sufficient length for taut attachment to a first eye hook (40) affixed to the lower portion of the side frame member (21). The purpose of this alternate embodiment is to provide a simple, yet efficient means, of removing the cable (4) from its operating position above the top frame member (2). This will facilitate maintenance of the billboard (3) by allowing a workman to place a hooked ladder on the top frame member (2) without having the cable (4) caught within the hooks of the ladder.

To accomplish this, a second eye hook (37) is provided adjacent to the top frame member (2) for guided passage of the cable (4) along the side frame member (21). A loop handle (49) is incorporated into the cable (4), which will enable the workmen to have a secured grip on the cable (4) thus allowing the workmen to safely re-connect the cable (4) to the installed eye hook (40). Below the second eye hook (37), the end of the cable is attached to a turn buckle (38) provided with a self-closing hook (39) for attachment of the cable (4) to the first eye hook (40). Above the second eye hook (37), a stop member (36) is affixed to the cable (4) to prevent complete passage of the cable (4) through the fourth support arm (43) when the cable (4) is detached from the first eye hook (40). By use of this structure, a workman can detach the self-closing hook (39) and allow the weight of the suspended portion of the cable (4) to pull the cable (4) through the fourth support arm (43) until contact is made with the stop member (36). The suspended portion of the cable (4), and the rotatable rings (1) thereon, will move to a hanging position located below the top frame member (2) and behind the billboard (3).

Figure 9:
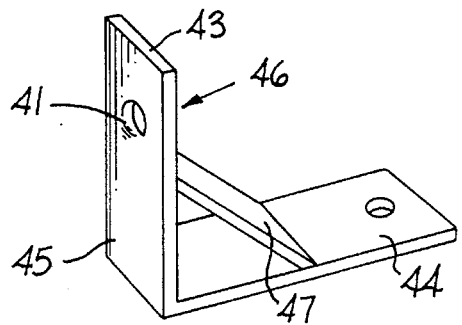
FIG. 9 is an enlarged perspective view of a fourth support arm of the invention having a gusset support.

So that the cable (4) will freely move to the hanging position behind the billboard (3), the second vertical member opening (41) of the fourth support arm (43), as shown in FIG. 9, is bevelled and de-burred so that the cable is not inhibited by any sharp corners on the second vertical member opening (41). In addition, to improve its functioning, the fourth support arm (43) has a horizontal portion (44) and a vertical portion (45), with the vertical portion (45) being twisted such that an inside face (46) of the vertical portion (45) points towards the back of the billboard (3). Furthermore, a gusset support (47) is affixed angularly between the vertical portion (45) and the horizontal portion (44) so as to provide extra strength to the fourth support arm (43).

Figure 10:
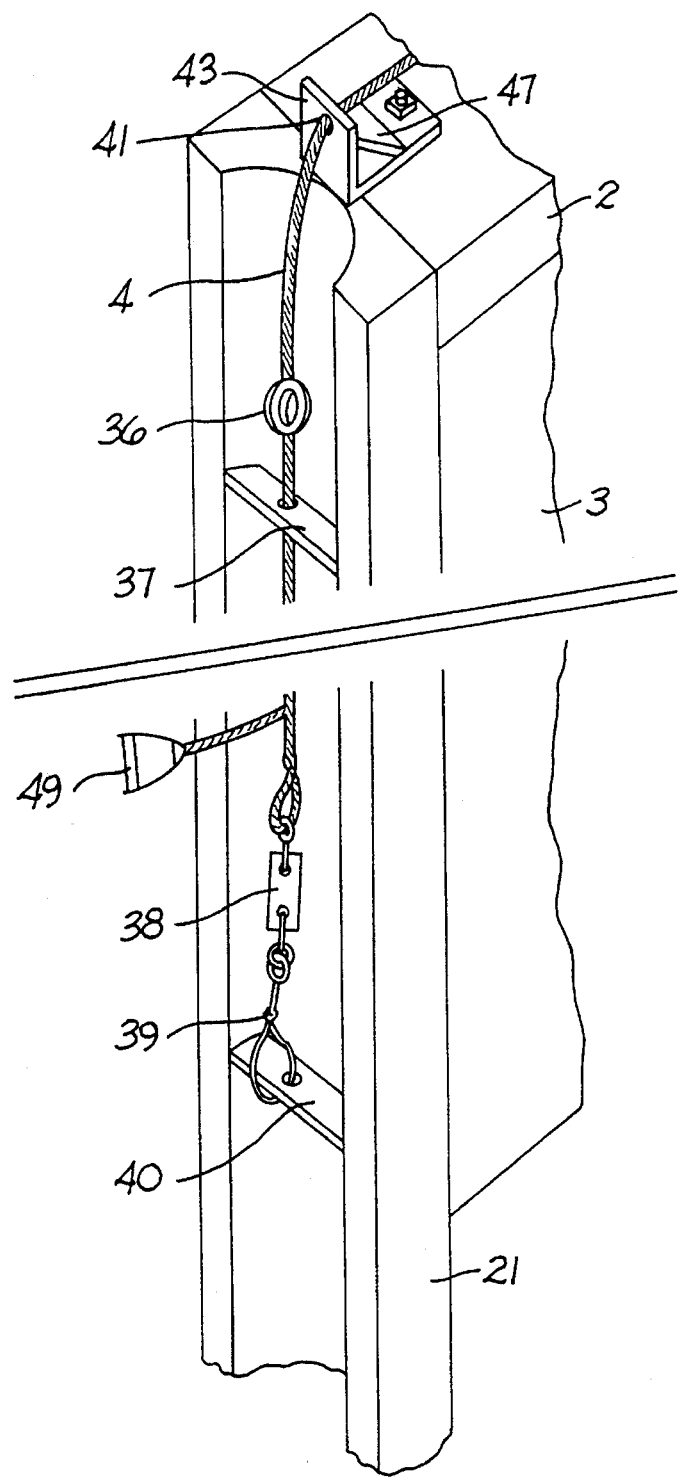
FIG. 10 is an enlarged perspective view of yet another alternate embodiment of the anti-perching device of the invention showing the cable secured within a recess of the side frame member.

In yet another embodiment, as shown in FIG. 10, the invention as described in the embodiment depicted in FIG. 8 is further modified to provide a recess (48) within the side frame member (21). The recess (48) is adapted to receive the cable (4) by means of both eye hooks (37, 40) being affixed within the recess (48) such that the securing means is hidden from view and the cable (4) is prevented from fluttering during windy conditions.

I claim:

1. A bird anti-perching device for discouraging birds from perching on or adjacent to a horizontally extending perching body, which comprises in combination:

a perching body comprising a longitudinally extending horizontally disposed cable of small diameter, a plurality of cylindrical rings of an internal diameter significantly larger than the cable diameter to balance unstably on the cable, said rings being disposed on said cable in an array adjacent one another along said cable sufficiently close to prevent a bird from landing on the cable but far enough apart from each other to permit uninhibited movement of individual rings about said cable for residence in an unstably balanced posture to permit individual free unstable movement of each ring relative to other rings with respect to its residence posture on the cable in response to the perching of a bird, said rings being of a dimension such that a bird attempting to perch on a ring will tend to unbalance the ring with respect to the cable, thereby to form an unstable perch.

2. The device of claim 1 wherein the rings comprise a flexible plastic material with an incision slot through the length of the rings for permitting distortion of the ring to install and remove rings at a site along the cable.

3. A bird anti-perching device for discouraging birds from perching on or adjacent to a horizontally extending perching body, which comprises in combination:

a longitudinally extending horizontally disposed, generally cylindrical cable member of small diameter, a plurality of cylindrical rings of an internal diameter larger than the member diameter disposed in an array adjacent one another on said member for residence along the member in an unstably balanced posture to permit individual free movement of each ring with respect to its residence posture on the member in response to the perching of a bird, said rings being of a dimension such that a bird attempting to perch on a ring will tend to unbalance the ring with respect to the member, thereby to form an unstable perch, a billboard, mounting means comprising a bracket for holding the cable member at a bird perching position and means for selectively adjusting the distance between the cable and the billboard.

4. The device of claim 3 wherein the means for adjusting the distance further comprises a pivoting mechanism for pivoting the cable with respect to the bird perch position on the billboard.

5. The device of claim 3 wherein the means for adjusting the distance further comprises means for tensioning the cable to attain two positions, namely one spaced from the bird perch position on said billboard and another adjacent the bird perch position on said billboard.

6. A bird anti-perching device for discouraging birds from perching on or adjacent to a horizontally extending perching body, which comprises in combination:

a longitudinally extending horizontally disposed bird perch, a horizontally disposed billboard member, a bracket for holding the bird perch at a bird perching position substantially parallel to said billboard member, and means for selectively adjusting the distance between the bird perch and the billboard member.

7. The device of claim 6 wherein the means for adjusting the distance further comprises a pivoting mechanism for pivoting the bird perch away from the billboard member.

8. The device of claim 6 wherein the bird perch comprises a flexible cable and the means for adjusting the distance further comprises means for tensioning the cable to attain two positions, namely one spaced from the billboard member, and another adjacent to the billboard member.

* * * * *